US012647181B2

(12) United States Patent
Bjørnstad

(10) Patent No.: US 12,647,181 B2
(45) Date of Patent: Jun. 2, 2026

(54) LOCATING DISTURBANCES IN OPTICAL FIBRES

(71) Applicant: Tampnet AS, Stavanger (NO)

(72) Inventor: Steinar Bjørnstad, Stavanger (NO)

(73) Assignee: TAMPNET AS, Stavanger (NO)

( * ) Notice: Subject to any disclaimer, the term of this patent is extended or adjusted under 35 U.S.C. 154(b) by 289 days.

(21) Appl. No.: 18/280,407

(22) PCT Filed: Mar. 4, 2022

(86) PCT No.: PCT/GB2022/050580
§ 371 (c)(1),
(2) Date: Sep. 5, 2023

(87) PCT Pub. No.: WO2022/185074
PCT Pub. Date: Sep. 9, 2022

(65) Prior Publication Data
US 2024/0195499 A1 Jun. 13, 2024

(30) Foreign Application Priority Data

Mar. 5, 2021 (GB) ...................................... 2103106

(51) Int. Cl.
H04B 10/079 (2013.01)
G01D 5/353 (2006.01)
(52) U.S. Cl.
CPC ..... H04B 10/0791 (2013.01); G01D 5/35341 (2013.01); H04B 10/07951 (2013.01); H04B 10/07957 (2013.01)
(58) Field of Classification Search
CPC .................................................. H04B 10/0791
See application file for complete search history.

(56) References Cited

U.S. PATENT DOCUMENTS 7,885,539 B2 2/2011 Leppla et al.
7,903,977 B2 3/2011 MacDonald et al.
(Continued)

FOREIGN PATENT DOCUMENTS

JP H 01-218139 A 8/1989
JP H 07-83792 A 3/1995
(Continued)

OTHER PUBLICATIONS

Barcik et al., "Measurement of slow and fast polarization transients on a fiber-optic testbed," Optics Express, vol. 28, No. 10, May 11, 2020, 8 pages.
(Continued)

*Primary Examiner* — Nathan M Cors
(74) *Attorney, Agent, or Firm* — Klarquist Sparkman, LLP

(57) ABSTRACT

An apparatus for determining a position of a disturbance to an optical fibre assembly comprises a detector system that receives concurrently, from the optical fibre system, a first digital optical signal having a first wavelength and a second digital optical signal having a second wavelength. The apparatus monitors a common parameter of the first and second signals over time and determines respective times at which a change occurs in said parameter in each signal, the change arising from a disturbance to the optical fibre assembly. The apparatus uses the first and second times to determine a position of the disturbance.

24 Claims, 3 Drawing Sheets

(56) References Cited

U.S. PATENT DOCUMENTS

| | | | |
|---|---|---|---|
| 8,670,662 | B2 * | 3/2014 | Healey ............... G01D 5/35303 |
| | | | 398/16 |
| 8,736,826 | B2 | 5/2014 | Lovely et al. |
| 8,873,064 | B2 * | 10/2014 | Tapanes ............. G01B 9/02027 |
| | | | 356/478 |
| 9,379,771 | B2 | 6/2016 | Fludger |
| 9,680,567 | B2 | 6/2017 | Swanson et al. |
| 2007/0253662 | A1 | 11/2007 | Patel et al. |
| 2007/0264012 | A1 * | 11/2007 | Healey ................. H04B 10/079 |
| | | | 398/13 |
| 2008/0232795 | A1 * | 9/2008 | Klar ..................... G01M 11/338 |
| | | | 398/13 |
| 2009/0135428 | A1 | 5/2009 | Healey |
| 2010/0117830 | A1 * | 5/2010 | Strong ................... G01H 9/004 |
| | | | 340/555 |
| 2011/0320147 | A1 * | 12/2011 | Brady ................ G01D 5/35361 |
| | | | 385/12 |
| 2013/0188176 | A1 * | 7/2013 | Lovely ................... G01D 5/353 |
| | | | 356/73.1 |
| 2019/0120663 | A1 * | 4/2019 | Suzaki ................... H04B 10/85 |
| 2019/0280942 | A1 | 9/2019 | Côté et al. |
| 2019/0379589 | A1 | 12/2019 | Ryan et al. |

FOREIGN PATENT DOCUMENTS

| | | | |
|---|---|---|---|
| JP | 2000-48269 | A | 2/2000 |
| KR | 101072747 | B1 | 10/2011 |
| WO | WO 2022/185074 | A1 | 9/2022 |
| WO | WO 2022/185075 | A1 | 9/2022 |

OTHER PUBLICATIONS

Calnex Solutions Ltd., "Implementing IEEE 1588v2 for use in the mobile backhaul," Technical Brief, © 2019, 24 pages.

"Charlton et al., ""Field measurements of SOP transients in OPGW, with time and location correlation to lightning strikes,"" Optics Express, vol. 25, No. 9, May 1, 2017, 8 pages.".

Dou et al., "Distributed Acoustic Sensing for Seismic Monitoring of The Near Surface: A Traffic-Noise Interferometry Case Study," Scientific Reports, Sep. 14, 2017, 12 pages.

Eidson, Agilent Technologies, "IEEE-1588 Standard for a Precision Clock Synchronization Protocol for Networked Measurement and Control Systems," Oct. 10, 2005, 94 pages.

Fernando, "Two methods measure chromatic dispersion," edn.com/two-methods-measure-chromatic-dispersion/, Mar. 1, 2022, 7 pages.

International Search Report and Written Opinion for PCT/GB2022/050580, Mailed Jul. 1, 2022, 21 pages.

International Search Report and Written Opinion for PCT/GB2022/050581, Mailed Jul. 5, 2022, 19 pages.

Kamalov et al., "What's shaking? Earthquake detection with submarine cables," Google Cloud Blog, Jul. 16, 2020, 6 pages.

"Linze et al., ""Development of an Intrusion Sensor Based on a Polarization—OTDR System,"" IEEE Sensors Journal, vol. 12, No. 10, Oct. 2012, pp. 3005-3009.".

Marra et al., "Ultrastable laser interferometry for earthquake detection with terrestrial and submarine cables," Science 361, Aug. 3, 2018, pp. 486-490.

Pietralunga et al., Fast Polarization Effects in Optical Aerial Cables Caused by Lightning and Impulse Current, IEEE Photonics Technology Letters, vol. 16, No. 11, Nov. 2004, pp. 2583-2585.

Shaik, "EDFA (Erbium Doped Fiber Amplifier)," Physics and Radio-Electronics, downloaded from https://www.physics-and-radio-electronics.com/blog/edfa-erbium-doped-fiber-amplifier, 12 pages. 2020.

"Sakolov, ""Particularities of Polarization-Mode Dispersion in optical fiber with Wavelength Division Multiplexing during the Lightning stroke,"" 2007 International Symposium on Electromagnetic Compatibility, Oct. 2007, pp. 448-450.".

"Šlapák et al., ""Polarization Changes as Early Warning System in Optical Fiber Networks,"" 2019 42nd International Conference on Telecommunications and Signal Processing (TSP)," Jul. 2019, 5 pages.

Wu et al., "Multi-Point Disturbance Detection and High-Precision Positioning of Polarization-Sensitive Optical Time-Domain Reflectometry," Journal of Lightwave Technology, vol. 34, No. 23, Dec. 1, 2016, pp. 5371-5377.

Wu et al., "Multi-point Detection for Polarization-sensitive Optical Time Domain Reflectometry and Its Applications in Electric Power Industry," 2016 Progress In Electromagnetic Research Symposium (PIERS), Aug. 8-11, 2016, pp. 4912-4918.

"Wuttke et al., Polarization Oscillations in Aerial Fiber Caused by Wind and Power-Line Current," IEEE Photonics Technology Letters, vol. 15, No. 6, Jun. 2003, pp. 882-884.

* cited by examiner

LOCATING DISTURBANCES IN OPTICAL FIBRES

CROSS REFERENCE TO RELATED APPLICATIONS

This is the U.S. National Stage of International Application No. PCT/GB2022/050580, filed Mar. 4, 2022, which was published in English under PCT Article 21(2), which in turn claims the benefit of Great Britain Application No. 2103106.7, filed Mar. 5, 2021.

BACKGROUND OF THE INVENTION

The present invention relates to apparatus and methods for determining the position of a disturbance in an optical fibre.

Modern society is increasingly reliant on electronic communication and data-transport infrastructure. Current telecommunication cable networks span distances which range from a few hundred meters to thousands of kilometres, with sub-sea cables extending along the ocean floor to allow signals to be exchanged between parties in different countries and continents, or between land-based and off-shore installations.

Optical fibre networks have become increasingly popular owing to the speed and reliability of communications that they can deliver. As a result of this widespread dependence on electronic communication technology, it has become important to ensure that this infrastructure is constantly available and performs reliably. Consequently, any potential weaknesses or failures in such communication networks, such as disturbances or breakages in a communications cable, must be detected and resolved as quickly as possible in order to prevent the loss of data or a breakdown in communication.

In some cases, it may be sufficient to detect simply that a disturbance or breakage has occurred, and to determine the location of the fault by physically inspecting the length of the cable. However, in the case of long-distance communication, it is desirable to be able to determine the location of a fault accurately without requiring a time-consuming and expensive inspection of the entire cable.

Although techniques have been developed for estimating the position of a disturbance in an optical fibre cable, these are often not applicable to optical fibre cables of the lengths typically used in the communications industry. Some such techniques involve the use of an Optical Time Domain Reflectometer (OTDR) to perform Distributed Acoustic Sensing (DAS). In this method, light pulses are transmitted into an optical fibre and measurements are taken of backscattered Rayleigh reflections. Using a narrowband coherent laser as a transmitting source allows a comparison of the phase of the received signal to be compared with the phase of the transmitted signal. Changes in the optical path of the optical fibre, caused by physical disturbances to the fibre, can thus be detected.

However, such techniques are not well suited for optical fibre communication systems spanning distances beyond 100 km. Network elements comprising signal amplifiers are typically required to be distributed along longer cables in order to compensate for attenuation of the signal in the optical fibres. These network elements may be electro-optical, converting the optical signal to an electrical signal in order to regenerate the signal before it is converted back to an optical signal. In this case, the incoming optical signal is terminated at the input of the network element, thus preventing any OTDR measurements beyond the termination point. If the network elements comprise optical amplifiers, such as Erbium Doped Fibre Amplifiers (EDFA) or Raman amplifiers, then optical isolators are typically used to prevent light from being reflected back towards the transmitter. Again, as a result, OTDRs cannot be used to determine the location of a disturbance as backscattered reflections cannot be detected.

Thus, there is a need for apparatus and methods for determining a location of a disturbance in an optical fibre that overcome these shortcomings.

SUMMARY OF THE INVENTION

When viewed from a first aspect, the invention provides an apparatus for determining a position of a disturbance to an optical fibre assembly, the apparatus comprising:

a detector system; and a processing system, coupled to the detector system, wherein the apparatus is arranged to:

receive concurrently at the detector system a first digital optical signal having a first wavelength from an optical fibre assembly and a second digital optical signal having a second wavelength from the optical fibre assembly;

measure a common parameter of the first and second digital optical signals, monitor the parameter of the first and second digital optical signals over time;

determine first data representative of a first time, being a time at which a change occurs in said parameter of the first digital optical signal received at the detector system, the change arising from a disturbance to the optical fibre assembly;

determine second data representative of a second time, being a time at which a change occurs in said parameter of the second digital optical signal received at the detector system, the change arising from the disturbance to the optical fibre assembly; and process the first data and the second data to determine a position of the disturbance.

When viewed from a second aspect, the invention provides a method of determining a position of a disturbance to an optical fibre assembly, the method comprising:

receiving a first digital optical signal having a first wavelength and a second digital optical signal having a second wavelength from an optical fibre assembly;

monitoring a common parameter of the received first and second digital optical signals over time;

determining first data representative of a first time, being a time at which a change occurs in said parameter of the received first digital optical signal, the change arising from a disturbance to the optical fibre assembly;

determining second data representative of a second time, being a time at which a change occurs in said parameter of the received second digital optical signal, the change arising from the disturbance; and processing the first data and the second data to determine a position of the disturbance.

When viewed from a third aspect, the invention provides a detector system for use in a method of determining a position of a disturbance to an optical fibre assembly, the detector system being configured to:

receive a first digital optical signal having a first wavelength and a second digital optical signal having a second wavelength from an optical fibre assembly;

monitor a common parameter of the received first and second digital optical signals over time; and determine first data representative of a first time, being a time at which a change occurs in said parameter of the received first digital optical signal, the change arising from a disturbance to the optical fibre assembly; and determine second data representative of a second time, being a time at which a change occurs in said parameter of the received second digital optical signal, the change arising from the disturbance;

wherein the first data and second data are suitable for processing to determine a position of the disturbance.

In a set of embodiments, the detector system may be configured to send the first data and the second data to a remote processing system (e.g. to a networked server, over a radio or cabled communications interface). The remote processing system may be configured to process the first data and the second data to determine a position of the disturbance. The detector system and remote processing system may together provide apparatus according to a further aspect of the invention. Thus it will be appreciated that embodiments of the present invention determine a position at which a disturbance to an optical fibre assembly has occurred from respective times at which the same disturbance is detected in first and second data signals having different wavelengths, due to the different speeds at which different wavelengths of light travel through an optical fibre-a phenomenon known as chromatic dispersion.

The disturbance may be a physical disturbance, such as a displacement or vibration of the optical fibre assembly, or a non-physical disturbance that influences the transmission of light through the optical fibre assembly, such as a changing electromagnetic field. It may be caused by physical contact (e.g. an impact), which may be an impact caused by a vehicle, such as impact by a boat or by fishing tackle fastened to a boat; or may be caused by acoustic waves, electromagnetic interference from an electromagnetic field (e.g. caused by a lightning strike or by a switching of current direction in a nearby power cable), or any other means. The applicant has determined that monitoring for changes in parameters, such as state of polarisation (SOP), of transmitted signals can enable particularly sensitive detection, and accurate localisation, of disturbances along fibre optic cables.

The position can, at least in some embodiments, be determined by monitoring changes in the parameter at a single location, which may simplify deployment. The detector system may be or comprise a detector unit comprising an input for the optical fibre assembly. The detector unit may be in a housing. It may be located at an end (i.e. terminus) of the optical fibre assembly or at a mid-point along the optical fibre assembly—e.g. as a relay or a passive monitoring device. The detector unit and the processing system may be in a single unit or may share a common housing, although this is not essential. In some embodiments, the detector system may comprise two separate units: a first detector unit configured to measure the common parameter of the first digital optical signals (and optionally to determine the first data), and a second detector unit configured to measure the common parameter of the second digital optical signals (and optionally to determine the second data). An optical splitter may direct the first digital optical signals to the first detector unit, and the second digital optical signals to the second detector unit. One of the detector units, or a further unit, may be configured to process the first data and the second data. In such embodiments, the first and second detector units are preferably located at a common optical path length from the optical splitter, and may be situated proximate each other (e.g. at a common building or installation site).

The first and second digital optical signals may comprise telecommunication signals. The first digital optical signal may comprise a first stream (i.e. succession) of data packets. The second digital optical signal may comprise a second stream of data packets. The detector system may comprise a demodulator for demodulating the first and second digital optical signals.

The optical fibre assembly may comprise a set of one or more optical fibres. The apparatus may, in some embodiments, comprise the optical fibre assembly. The optical fibre assembly may extend to transmission apparatus, e.g. at a remote point along the optical fibre(s) of the optical fibre assembly, or the apparatus may comprise a set of one or more optical fibre segments, e.g. for coupling to further optical fibres.

In a first set of embodiments, the optical fibre assembly comprises a first optical fibre arranged to carry the first digital optical signal past the disturbance to the detector system and a second optical fibre arranged to carry the second digital optical signal past the disturbance to the detector system—i.e. a pair of optical fibres. The detector system may comprise a first input for receiving the first digital optical signal on a first optical fibre and a second input for receiving the second digital optical signal on a second optical fibre. The two fibres may be contained in respective optical fibre cables (which may comprise separate respective housings or sheaths), which may be laid parallel and in close proximity for at least a majority of their length. The optical fibres cables may be submarine cables. In some embodiments, the optical fibre cables are aerial cables, e.g. overhead lines suspended from pylons. The respective optical fibre cables may be touching or separated by an average or maximum of at most one, five or ten metres along a majority or all of their lengths. In this way, both fibres of the pair are likely to be sufficiently closely laid along at least a majority of their length that both experience the same disturbance.

Preferably, however, the fibres of the optical fibre pair are arranged within a single optical fibre cable—i.e. within a common housing or sheath. Methods embodying the invention may be particularly effective in such situations, since this may increase the likelihood that a disturbance to one optical fibre will affect both optical fibres and, thus, transmission of both the first digital optical signal and the second digital optical signal.

In a second set of embodiments, the apparatus is configured to receive the first and second digital optical signals from a single (i.e. shared) optical fibre. The single optical fibre may be carried in an optical fibre cable, on its own or with one or more other optical fibres. The signals may be carried along the fibre using Wavelength Division Multiplexing (WDM). This can provide efficient usage of bandwidth and reduce the total number of fibres required in a cable. Receiving both signals along a common optical fibre also helps to ensure that any disturbance to the fibre will affect both signals.

The apparatus may further comprise a transmitter unit, arranged to transmit the first and second digital optical signals to the detector system via the optical fibre assembly. The transmitter unit may be separated from the detector system by ten, hundreds or thousands of kilometres. The transmitter unit may comprise a first optical transmitter (e.g. a laser diode) for converting a first electrical signal into the first optical signal having the first wavelength. The transmitter unit may comprise a second optical transmitter for converting a second electrical signal into the second optical signal having the second wavelength. The transmitter unit may comprise a WDM multiplexer configured to receive the first and the second digital optical signals from the first optical transmitter and the second optical transmitter respectively and to transmit the first and second signals on a single fibre or on respective fibres of a pair of fibres of the optical fibre assembly. The transmitter unit may further comprise a modulator for modulating the first and the second optical signals.

The optical fibre assembly may comprise a plurality of individual optical fibres. A high number of optical fibres (e.g. tens or hundreds) may be embedded within the same cable so as to provide a high availability of fibre connectivity. This can be beneficial for telecommunication systems, which may be used by a large number of customers.

The optical fibre assembly may comprise a plurality of optical fibre segments that are joined (e.g. spliced or coupled end-to-end) to form a longer single signal path or pair of paths. The apparatus may further comprise one or more optical amplifiers for amplifying the first and second digital optical signals. The optical amplifier(s) may be located along the optical fibre assembly. The optical amplifier(s) may comprise an Erbium Doped Fibre Amplifier (EDFA). The optical amplifiers may comprise Raman amplifiers, which can provide long-distance spans (e.g. 500 km) of optical fibre without intermediate amplification, or other suitable optical amplification technology, such as Semiconductor Optical Amplifiers (SOA).

Preferably the detector system comprises one or more light detectors for receiving the first and the second digital optical signals. The detector system may comprise a WDM de-multiplexer. The light detectors may comprise one or more electro-optical sensors (e.g. photodiodes) for converting the digital optical signals into electrical signals. The light detectors may further comprise one or more demodulators for demodulating the received optical signals. Each light detector may comprise a coherent or non-coherent receiver. In embodiments comprising a coherent receiver, the coherent receiver may be configured to measure said common parameter (e.g. SOP or signal strength) of the first and/or the second digital optical signal.

The detector system (optionally in combination with a remote processing system) may comprise an optical analysis system arranged to monitor the parameter of the first and second digital optical signals respectively. In embodiments in which the apparatus comprises a coherent receiver, the optical analysis system may be within the coherent receiver. This may allow the monitoring components to form an integrated part of the digital optical signal transmission system. The optical analysis system may comprise one or more filters for filtering out changes in the parameter that occur at a frequency above a low-pass threshold. For example, in embodiments in which the parameter is used for modulation of the first and/or second digital optical signals, the optical analysis system may comprise one or more filters for removing modulation components. The optical analysis system may comprise one or more filters for filtering out changes in the parameter that occur at a frequency below a high-pass threshold (e.g. caused by slow-changing temperature fluctuations in the fibre). It may comprise low pass-filters, high-pass filters and/or band-pass filters.

The parameter may be a physical parameter of the signals, or it may be a metric that the detector system can measure by analysing data encoded on the signals. It may be a state of polarisation (SOP) of the optical signals. When a physical disturbance is experienced by the optical fibre assembly, e.g.

due to direct impact or due to sound waves, it is likely that a detectable change in the SOP of the digital optical signals will occur. Thus, by monitoring the SOP of the first and second digital optical signals, the occurrence of a disturbance can be detected. The parameter may be the optical power (i.e. amplitude) of the signals, or a signal-to-noise ratio (SNR) of the signals, or a bit error ratio (BER) for the signals, or some other property or metric. In some embodiments, the parameter may be a time derivative of any of these properties. The SNR or BER for each signal may be determined by a demodulator or decoder of the detecting system. If a disturbance is experienced by the optical fibre or optical fibre pair, it is likely that a change in the SOP and/or signal strength and/or SNR of the signals within the fibre or fibre pair will occur, at the position where the disturbance takes place. Thus, by monitoring the parameter at the detector system, the occurrence of a disturbance can be detected.

The apparatus (i.e. the detector system, optionally with an associated processing system) may be configured to monitor the parameter of the first and second signals over time. The apparatus may be configured to monitor the parameter continually—e.g. by sampling the parameter at regular intervals. The apparatus may be configured to monitor the parameter for each packet (or for a fragment of each packet) received at the apparatus, potentially multiple times over the duration of each packet. The apparatus may be configured to monitor the parameter for a subset or all of the packets received at the apparatus over the fibre assembly. The apparatus may be configured to monitor for changes in the parameter between two (e.g. immediately) successive packets, or within a single packet, of the same digital signal—i.e. of the same wavelength. The apparatus may be configured to monitor for a change in the parameter, for a particular signal, over a fixed time interval. In some embodiments, the apparatus (e.g. the processing system in particular) is configured to calculate a derivative of the parameter with respect to time for each of the first and second signals.

If a disturbance is experienced by the optical fibre assembly, it is possible that a change in more than one of SOP, amplitude (i.e. signal strength) and/or phase and/or signal-to-noise ratio (SNR) of the signals will occur, the timing of which may be indicative of the location of the disturbance along the fibre optic assembly. The disturbance may also then lead to a detectable change in a respective bit error ratio (BER) determined for each digital signal. The applicant has determined that, in general, monitoring changes in SOP is more sensitive to small disturbances than monitoring changes in amplitude and SNR, and is more straightforward to implement than monitoring changes in phase. For example, while even slight bending of an optical fibre cable may cause a detectable SOP change, a detectable change in amplitude might only occur when significant bending is experienced. Nevertheless, in some embodiments, the apparatus may be configured to monitor a further parameter of the first and/or second digital optical signals, received at the apparatus, in addition to monitoring the parameter. This may be useful for increasing sensitivity or for discriminating between different types of disturbance.

The further parameter may be SOP, amplitude, signal-to-noise ratio (SNR), bit error ratio (BER), or a time derivative of any of these, or some other parameter or metric. The apparatus may be configured to generate analog or digital electrical signals representative of any one or more of a SOP, an amplitude, a phase, a SNR or a BER of the first and/or second digital optical signals respectively. SNR or BER may be determined by a demodulator or decoder of the apparatus.

The apparatus may be configured to process data representative of the further parameter, for one or both of the first and second digital optical signals, when determining the position of the disturbance.

The apparatus may be configured to compare changes in the parameter with changes in the further parameter, for one or both of the first and second signals. This may help to improve the reliability of a detection that a disturbance has taken place. It may also allow identification of the type of disturbance to be undertaken (e.g. using machine learning methods) based on monitored values of the parameters. In some embodiments, the apparatus may be configured to use BER to distinguish between changes in SOP, amplitude or phase caused by a disturbance and changes due to modulation of the digital optical signals. This may improve sensitivity to disturbances such as lightning strikes that can produce frequency artefacts close to frequency components in the modulated signal (which could be components similar to the modulation rate, which might be tens or hundreds of GBaud, or lower-frequency components of the signal).

The optical analysis system may comprise a first optical analysis component and a second optical analysis component. The first optical analysis component may be configured to output a first monitoring signal that represents changes in the parameter for the first digital optical signal. The second optical analysis component may be configured to output a second monitoring signal that represents changes in the parameter for the second digital optical signal. In some embodiments, the first and second optical analysis components may be components of respective first and second coherent receivers of the apparatus.

The first and the second optical analysis components may be configured to time-stamp the first and second monitoring signals respectively according to times that the first and second digital optical signals respectively arrive at the apparatus, using a clock of the apparatus. This means that the respective times-of-arrival of changes in the parameter (e.g. that are indicative of a disturbance to the optical fibre assembly) at the apparatus can be determined.

The apparatus may be configured to synchronise the clock of the apparatus with an external clock using a synchronisation signal. This can allow the time of a disturbance to be determined with respect to a global timeframe, for example. The apparatus may be configured to receive the synchronisation signal over the optical fibre assembly. In some embodiments, the synchronisation signal is a Global Positioning System (GPS) signal. The synchronization signal may be a Global Navigation Satellite System (GNSS) signal. In some embodiments, the apparatus is configured to receive time-stamped synchronisation packets over the optical fibre assembly for the purpose of synchronising the clock with an external clock. The time-stamped synchronisation packets may be embedded within the first and/or second digital optical signals—e.g. interleaved between data packets.

The first and second monitoring signals may be optical signals or electrical signals. The first data may comprise or be derived from some or all of the first monitoring signal. The second data may comprise or be derived from some or all of the second monitoring signal.

The processing system may be configured to determine, from the first data, a time (e.g. said first time) at which a change in the parameter of the first digital optical signal occurs that is indicative of the disturbance, or a possible disturbance, to the optical fibre assembly. This may comprise determining that a change in the parameter of the first optical signal meets a first criterion. It may comprise detecting when a change in the parameter of the first digital optical signal exceeds a first threshold. Similarly, the processing system may be configured to determine, from the second data, a time (e.g. said second time) at which a change in the parameter of the second digital optical signal occurs that is indicative of the disturbance, or a possible disturbance, to the optical fibre assembly. This may comprise determining that a change in the parameter of the second optical signal meets a second criterion. Determining the second time may comprise determining whether the change in parameter of the second digital optical signal exceeds a second threshold. In some embodiments, the second criterion may be different to the first criterion. However, preferably the second criterion is the same as the first criterion. Thus, preferably the first threshold is equal to the second threshold. Preferably the processing system is configured to process the first data and the second data to determine a position of the disturbance in response to the processing system determining (and preferably only when the processing system determines) that the first data and the second data meet the first criterion and the second criterion respectively.

The first and/or second threshold may be set such that any change in the respective parameter meets the first and/or second criterion respectively. However, in preferred embodiments, the first and/or second thresholds are non-trivial or greater than zero; they may be set such that below-threshold changes in the parameter, e.g. resulting from noise in the signal that is unlikely to be caused by a disturbance of interest, do not meet the first and/or second criterions. This helps to ensure that only significant parameter changes, which are likely to have been caused by a disturbance to the optical fibre assembly, are used to determine the position of a disturbance. This can make the processing more efficient and help to avoid spurious detections. This may advantageously limit the amount of data that needs to be transmitted, e.g. over a communication link to a remote processing system, for further processing to determine the position.

The apparatus may comprise a position localiser module (e.g. as a component of the processing system), which may be configured to determine (i.e. estimate) the position of the disturbance from the first and second data. It may be configured to determine the position from a difference between the first time and the second time. The position localiser module may be configured to receive the (e.g. time-stamped) first and second monitoring signals (which may form part of all of the first and second data). It may comprise an application-specific integrated circuit and/or one or more processors and memory storing software for execution by the processors. It may be located adjacent or proximate or integrated with the detector system, or it may be remote from the detector system—e.g. comprising a network server. It may be communicatively connected to the detector system by one or more wired or wireless channels.

In some but not all embodiments, the position localiser module is configured to determine whether changes in the parameter of the first and second digital optical signals meet the first and second criterion respectively.

In some embodiments, the position of a disturbance may be determined using an algorithm that takes the first and second times as inputs, but that processes no other times of changes in the parameter arising from the same disturbance. However, in other embodiments, the first and second data each represent a plurality of times of a plurality of parameter changes in each digital optical signal, some or all of which may arise from the disturbance, and the position is determined by processing the data representative of the plurality of parameter changes in each optical signal. The first and second data may, for example, each comprise a respective parameter signal comprising a time series of values representative of times of changes in the parameter—e.g. comprising a time series of values representative of changes in the parameter, with associated timing information (such as one or more time stamps). The time series may be regularly or irregularly spaced. Considering a plurality of parameter changes in each received signal, rather than just the time of a single parameter change, may improve the accuracy of the position determination process.

The processing system (e.g. within the position localiser module or at the detector system) may comprise one or more comparators or correlators configured to determine whether a change in the parameter in the first or second digital optical signal meets the first or second criterion respectively. The processing system may be configured to make this determination using the first and second monitoring signals. It will be appreciated that, by time-stamping the first and second monitoring signals, the first and second times (at which changes in the parameter meet the first and second criterion respectively) can be straightforwardly determined.

The first data may comprise a first series of values (i.e. a first parameter signal) representative of a plurality of changes in the parameter of the first digital optical signal over time. The series preferably includes or spans the first time, such the first parameter signal is representative of the change in parameter at the first time. The second data comprises a second series of values (i.e. a second parameter signal) representative of changes in the parameter of the second digital optical signal over time. This series preferably includes or spans the second time, such that the second parameter signal is representative of the change in parameter at the second time. Each parameter signal may comprise a respective monitoring signal, as disclosed above, or may comprise a portion thereof, or it may be derived from a respective monitoring signal. Each parameter signal preferably comprises timing information, such as one or more time stamps. Each parameter signal may be a time series of values, although this is not essential and each parameter signal may, in some embodiments, encode information in a frequency domain (e.g. after a Fourier transform).

The processing system (e.g. within the position localiser module) may be configured to compare or cross-correlate the first parameter signal with the second parameter signal, for determining the position of the disturbance. Each parameter signal (or the first and second data more generally) may encode or otherwise represent the parameter (e.g. as a time-series of absolute or relative values), or a time derivative of the parameter, or frequency or spectral information relating to changes in the parameter over time (e.g. determined by Fourier analysis). The processing system may be configured to determine a similarity measure representative of a degree of similarity between the change or a series of changes in the parameter of the first optical signal at or spanning the first time and the change or a series of changes in the parameter of the second optical signal at or spanning the second time. The measure may represent similarity in magnitude of change, direction of change, pattern of change over time, or a combination of these. This may comprise determining a correlation coefficient between the parameter, or change in the parameter, at or over the first time and the parameter, or change in parameter, at or over the second time. The similarity measure may comprise a correlation coefficient.

By correlating changes in the same parameter at the detector system, it can be determined whether the changes in the parameter are likely to have been caused by the same disturbance, based on how similar respective patterns of parameter changes are over time. If a particular pattern of change in the parameter is registered for only one of the digital optical signals, then it is unlikely to have been caused by a disturbance, as this would result in a similar change in the parameter in both signals. The processing system may be arranged to cross-correlate the first and second monitoring signals, or respective portions thereof.

The processing system may use a cross-correlation operation to determine a time difference between the respective times represented by the first and second data—e.g. based on a time location of a peak in the cross-correlation. The processing system may be configured to perform the cross-correlation within a sliding time-window having a fixed size—i.e. limiting the cross-correlation to a maximum time shift. This can reduce the processing load. The size of the time-window may correspond to a maximum possible time difference between the first time and the second time, for the optical fibre assembly, based on the length of the optical fibre assembly. This may correspond to the case in which the disturbance is located at a furthest point along the optical fibre or pair of optical fibres away from the detector system, such as at or adjacent a transmitter unit.

The processing system may be configured to determine whether the similarity measure (e.g. correlation coefficient) exceeds a correlation threshold. In response to determining that the similarity measure exceeds the correlation threshold, the processing system may be configured to proceed to determine or output the position of the disturbance. The processing system may be configured only to proceed to determine or output the position of the disturbance in response to determining that the similarity measure exceeds the correlation threshold. In some embodiments, this may improve the efficiency of the apparatus, as it means that the processing system need not attempt to determine the position of a disturbance when a disturbance is unlikely to have occurred, and may reduce the chance of false (i.e. spurious) detections.

The processing system may be configured to determine the position of the disturbance as a distance along the optical fibre assembly from the detector system—e.g. as a value in metres. The processing system may be configured to determine the position of the disturbance as a set of coordinates, which may be in a local coordinate system or a global coordinate system (e.g. longitude and latitude). It may access map data to determine a two-dimensional position from a one-dimensional position along the optical fibre assembly.

Preferably the processing system is configured to determine the position of the disturbance from one or more, or all, of:

the time difference between the first time and the second time represented by the first and second data;

the total (aggregated) chromatic dispersion $d_c$ of the optical fibre assembly (and, where appropriate, other optical components); and the difference in the wavelengths $\lambda_1$, $\lambda_2$ of the first and second digital optical signals.

The processing system may be configured to determine the position by multiplying values representative of the time difference, the total chromatic dispersion, and the difference in the wavelengths, to determine a value representative of a distance along the optical fibre assembly from the detector system. It may output this distance value as the position, or it may further process the distance value to determine the position—e.g. using a map of the optical fibre assembly to determine the position as 2D or 3D coordinates.

The apparatus may comprise a display screen or a loud-speaker or other output mechanism for informing a human user of the disturbance. The processing system may be configured to output a signal of a disturbance, which may include data representative of the position estimate. It may output the signal to a monitoring client, e.g. over a network connection. It may output the signal immediately, or as part of a periodic batch process—e.g. a daily log file.

The first and second digital optical signals may be generated by two different respective types of laser. The first and second wavelengths may be different wavelengths of visible light, or of infrared or ultraviolet light. They may be separated by any interval—e.g. 0.1, 1, 20, 40 nm or more. In general, a larger or maximum wavelength separation may be preferred, within the constraints of the optical fibre assembly, as this will increase the interval between the first and second times represented by the first and second data, which may increase the accuracy of the position determination. Thus, the lowest wavelength channel and the highest wavelength channel within the WDM system may be used as the first and second signals respectively, as this increases the likelihood of obtaining a large interval between the first and second times.

In some embodiments, the optical fibre assembly is arranged to carry further digital optical signals having respective wavelengths that are different to the first and the second wavelengths. This can increase the total capacity of the system without requiring the addition of further optical fibres, which can be expensive. The apparatus may be arranged to measure the common parameter of one or more of the further digital optical signals in addition to the first and second digital optical signals. The apparatus may be configured to determine the position of the disturbance using a change in the parameter of the one or more further digital optical signals. It may, in some embodiments, determine a plurality of distance values from respective pairs of three or more digital optical signals, and determine an average (e.g. a mean) of the plurality of distance values. In other embodiments, the processing system may be configured to apply a correlation method to changes in the parameter of three or more optical signals together, for determining the position—the correlation method may, in some embodiments, using machine learning.

The processing system may be distributed. A position localiser module may comprise some or all of the processing system. The processing system may comprise one or more computer processors and one or more memories storing software for execution by the processors. It may comprise digital sequential logic. It may comprise one or more FPGAs, ASICs, DSPs, or other electronic circuitry.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which:

FIG. 1 shows a schematic view of a position determination apparatus 1 in accordance with some embodiments of the present invention, comprising a submarine uni-directional optical fibre communications cable 2 and two transceivers 6, 8. The apparatus 1 also comprises a position localiser module 30 (shown in FIG. 2). The second transceiver 8 may be a detector system as disclosed herein. The communications cable 2 extends along a seabed 4 so as to allow a first transceiver 6 to send optical signals to a second transceiver 8. In some embodiments, a second uni-directional optical fibre cable may extend from a transmitting side of the second transceiver 8 to a receiving side of the first transceiver 6. However, only the communication from the first transceiver 6 to the second transceiver 8 will be shown and described herein. In this example, the second transceiver 8 and position localiser module 30 considered alone embody the invention, as also does the apparatus 1 considered as a whole.

Figure 1:
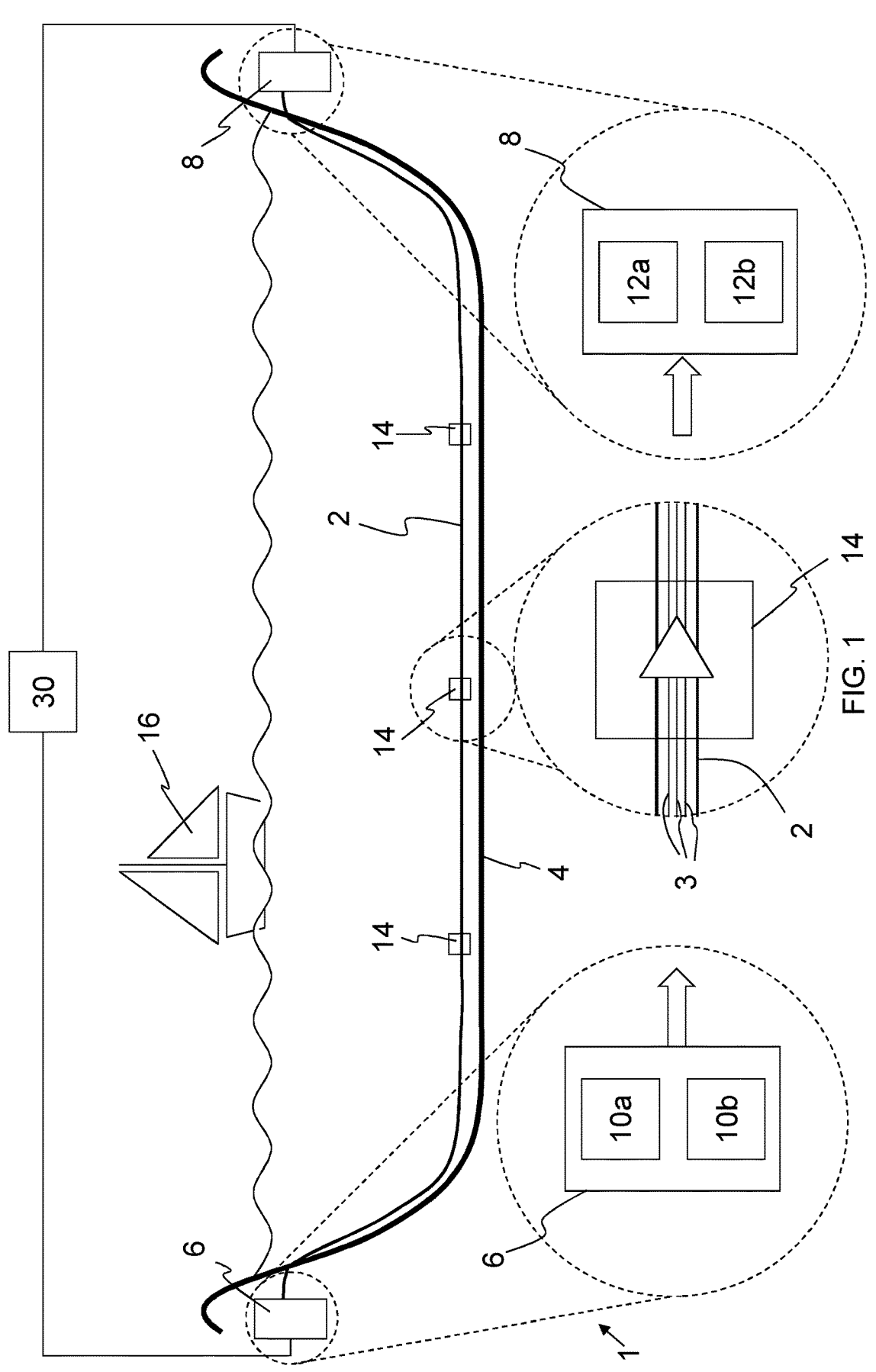
FIG. 1 is a schematic view of a position determination apparatus in accordance with an embodiment of the present invention.

The first transceiver 6 comprises two transmitter sources 10a, 10b (e.g. each comprising a laser diode and a modulator). The second transceiver 8 comprises two optical receivers 12a, 12b (e.g. comprising a photodiode and an amplifier). The optical fibre cable 2 comprises a set of one or more optical fibre cables 3, each of which is arranged to carry optical signals from the first transceiver 6 to the second transceiver 8. A large number of optical fibres 3 may be embedded within the same cable 2 in optical fibre communications systems so as to provide a high availability of fibre connectivity to telecommunication operator customers. However, in a simple case, the cable 2 could contain just a single fibre or a pair of fibres 3.

A disturbance of the optical fibre cable 2 may be any displacement or vibration of the cable 2 that might indicate or prelude possible interference to digital communications along the cable 2 or physical damage to the cable 2. Disturbances or breakages in the optical fibre cable 2 can be caused in a number of ways. Natural phenomena such as earthquakes or tsunamis may cause the optical fibre cable 2 to be moved or to vibrate in such a way as to damage the cable 2, or to otherwise disrupt the communications being transmitted from the first transceiver 6 to the second transceiver 8. Moreover, human activity may cause similar disturbances. Fishing vessels such as trawlers 16 can destroy the cable 2 if fishing equipment becomes entangled in the cable 2. Disturbances in the optical fibre cable 2 may also indicate the installation of eavesdropping equipment, e.g. for espionage purposes.

Regardless of the cause of the disturbance, it is beneficial to be able to determine accurately its location so that the situation can be dealt with quickly, whether by physical inspection, or repairing any damage to the optical fibre cable 2, or reporting inappropriate activity to a relevant authority, or monitoring for future issues, or by removing surveillance equipment, etc. Determining the position of the disturbance, as well as the time that the disturbance took place, can also be helpful in identifying a vessel responsible for the incident.

Owing to attenuation of the optical signal within the optical fibres 3 of the optical fibre cable 2, Erbium Doped Fibre Amplifiers (EDFA) 14 may be positioned at intervals of typically 100 km along the optical fibre cable 2. The EDFAs 14 amplify the optical signals within the optical fibres 3. In other embodiments, alternative amplifying techniques may be implemented, e.g. using Raman amplifiers.

The EDFAs 14 comprise isolators which prevent the reflection of light back along the optical fibres 3 towards the transmitters 10a, 10b. This means that Optical Time Domain Reflectometer (OTDR) methods involving the measurement of backscattered signals cannot be used to detect distur- bances in the optical fibre cable 2 that occur beyond the first EDFA 14 that is encountered between the first transceiver 6 and the second transceiver 8.

However, the state of polarization (SOP) of the light signals propagating through the EDFAs 14 is unaffected by the EDFAs 14. If the fibre cable 2 is physically moved, or if vibrations occur in the cable 2, it is likely that SOP changes will also occur in all of the optical fibres 3 within the cable 2, and affecting all wavelengths travelling along each fibre 3, at the position where the movement occurs. If the move- ment results in, for example, a bending of the cable 2, it is likely that attenuation of the signals in all of the fibres 3, of all wavelengths, at the same position along the cable 2, will also occur. Moreover, the SOP or attenuation may exhibit a similar temporal pattern of changes across multiple fibres 3 and/or across multiple wavelengths within a single fibre 3.

Electromagnetic fields (e.g. caused by lightning strikes or switching in power cables running alongside optical fibre cables) may impact SOP within the fibres 3, particularly those contained within aerial cables. This may cause changes with a higher frequency than those occurring as a result of acoustic waves inducing vibrations. These high frequency variations can allow the position of the distur- bance to be determined more accurately.

In optical coherent data-transmission systems, physical parameters such as SOP and signal strength can be measured by an off-the-shelf coherent signal receiver. However, the presently described embodiment uses receivers 12a, 12b that do not output SOP and amplitude values. Thus, separate monitoring components are provided for measuring the SOP of the received optical signals, as will be described in more detail below. By monitoring the SOP of the light signals received at the second transceiver 8, a disturbance anywhere along the optical fibre cable 2 can be detected.

Depending on the type of movement experienced by the optical fibre cable 2, a similar change in SOP or attenuation is likely to be experienced over a certain time-period by signals of different wavelengths in each of the optical fibres 3 within the cable 2. Thus, a disturbance can be detected by the second transceiver 8 by measuring the SOP and/or attenuation of the optical signals, received on one or more wavelengths, at an end of the cable 2. Moreover, a location of the disturbance along the cable 2 can be estimated from information relating to the differential detection timing of the effect of the disturbance on the SOP and/or attenuation of signals, carried at different wavelengths, by the second transceiver 8, as explained in more detail below.

Additionally, analysis of the parameter changes (e.g. together with analysis of changes in further parameters such as amplitude, SNR or BER) may allow the type of distur- bance that is most likely to have caused the changes to be determined. Such analysis could involve machine-learning or other signal-processing techniques.

Figure 2:
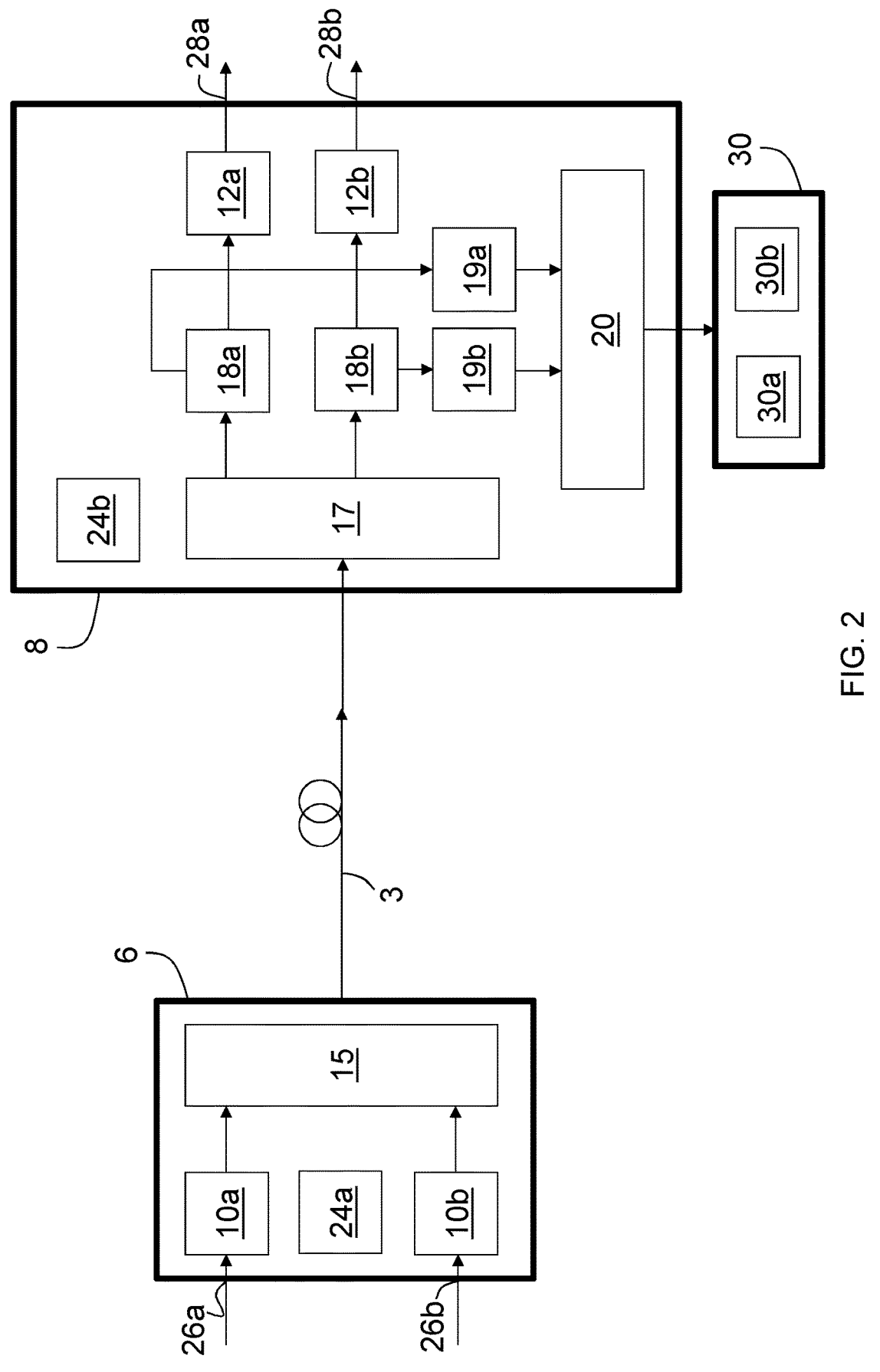
FIG. 2 is a more detailed schematic view of the position determination apparatus of FIG. 1.

FIG. 2 shows a more detailed schematic view of the transceivers 6, 8 of the position determination apparatus 1 as shown in FIG. 1.

The first transceiver 6 comprises a first optical transmitter 10a that is configured to output light of a first wavelength $\lambda_1$ and a second optical transmitter 10b that is configured to output light of a second wavelength $\lambda_2$. The first transceiver 6 further comprises a WDM multiplexer 15 and a clock 24a. The multiplexer 15 allows multiple channels to be established within the same optical fibre 3 by assigning each channel a particular wavelength with which optical signals belonging to said channel are to be transmitted.

The second transceiver 8 comprises a WDM de-multi- plexer 17 that is configured to separate the constituent channels into streams of optical signals having only a single wavelength $\lambda_1$, $\lambda_2$ each. The second transceiver 8 further comprises a first optical splitter module 18a and a second optical splitter module 18b, a first receiver 12a that is arranged to detect light of the first wavelength $\lambda_1$ and a second receiver 12b that is configured to detect light of a second wavelength $\lambda_2$. The second transceiver 8 further comprises first and a second optical analysis modules 19a, 19b, an electrical correlator 20 and a clock 24b. The second transceiver 8 may comprise a housing that contains these components in a single unit, although this is not essential— for instance, the first and second optical analysis modules 19a, 19b may be provided as separate units.

The correlator 20 may include electronic logic circuitry for performing operations on incoming optical or electrical signals. It may include an FPGA, or a computer processor and a memory comprising software for execution by the processor, in order to carry out operations described herein. However, in some embodiments, the correlator 20 may be adapted to receive optical signals.

In a variant set of embodiments, instead of a WDM multiplexer 15 and de-multiplexer 17, the two optical trans- mitters 10a, 10b output into two different respective fibres 3 of a pair of fibres within the same cable 2, or within two different cables lying substantially parallel to each other.

The position determination apparatus 1 further comprises a position localiser module 30, which is in communication with the second transceiver 8. The position localiser module 30 could be integrated with, or located alongside, the second transceiver 8, or it could be located remotely—e.g. with the first transceiver 6 or in a datacentre or server farm. The connection between the position localiser 30 and the second transceiver 8 may comprise one or more electrical and/or optical cables and/or wireless (e.g. radio) links. These could be dedicated connections, or they could be part of a larger network, e.g. the Internet.

The position localiser module 30 may comprise a proces- sor 30a and a memory 30b storing software, for execution by the processor 30a, for implementing processing operations as described herein. It may have one or more network interfaces, a power supply, and any other components of a computer or computing device.

Transmission of an optical data signal from the first transceiver 6 to the second transceiver 8 via an individual optical fibre 3 by way of WDM will now be described.

The first transceiver 6 receives, at respective data inputs 26a, 26b, a first and a second electrical data signal, respec- tively comprising a first and a second stream of data packets for transmitting across the optical fibre 3, and eventually for outputting from the second transceiver 8 from respective data outputs 28a, 28b.

The first transceiver 10a comprises a laser diode for converting the first electrical data signal into a first optical signal, having the first wavelength $\lambda_1$, which is then pro- vided to the multiplexer 15. The second transceiver 10b also comprises a second laser diode that converts the second electrical data signal into a second optical signal, having the second wavelength $\lambda_2$, that is also provided to the multi- plexer 15.

The multiplexer 15 is configured to output a multiplexed optical signal, comprising the first and second streams of data packets modulated on two different wavelength carriers, over the optical fibre 3 of the optical fibre cable 2 to the second transceiver 8. Between the first transceiver 6 and the second transceiver 8, the multiplexed optical signal is amplified by the EDFAs 14 (shown in FIG. 1).

The WDM de-multiplexer 17 of the second transceiver 8 is configured to separate the multiplexed optical signal into two separate optical signals—i.e. a first optical signal, comprising the first stream of data packets, having the first wavelength $\lambda_1$ and a second optical signal, comprising the second stream of data packets, having the second wavelength $\lambda_2$.

The first optical signal is provided to the first splitter module 18a, which is a passive splitter that separates the first optical signal into two equal optical signals: a first optical "data" signal, which can be subsequently processed to determine payload data, and a first optical "monitoring" signal, which is used to measure the SOP of the received signal. The second optical signal is provided to the second splitter module 18b, which separates the second optical signal into a second optical "data" signal and a second optical "monitoring" signal in the same way.

The second transceiver 8 further comprises a first and a second optical analysis module 19a, 19b (together embodying an optical analysis system) for measuring the SOP of the respective first and second optical monitoring signals. Each of the first and second optical analysis modules 19a, 19b may be configured to split the respective optical monitoring signals into two different (e.g. orthogonal) polarisations using a polarisation beam splitter, with a pair of photodiodes being used to sample the amplitude at each polarisation, to determine a two-dimensional SOP value for each sample period. Although using a polarisation beam splitter is a simple and inexpensive method for measuring polarisation, any other suitable or desired method may be used. For example, a three-dimensional SOP value may be found on a Poincare sphere using determined Stokes parameters.

A respective electrical monitoring signal indicative of the SOP is provided to the correlator 20 by the respective optical analysis components 19a, 19b. The electrical monitoring signals are time-stamped, by the optical analysis components 19a, 19b, with a time of arrival at the second transceiver 8 using a periodic clock signal provided by the clock 24b. As will be described in more detail below, time-monitored SOP changes can be correlated to determine changes that have been caused by a disturbance.

The optical data signals are provided to the receivers 12a, 12b, which convert the optical data signals into electrical data signals using respective photodiodes configured to detect the first and second wavelengths $\lambda_1$, $\lambda_2$ respectively. The electrical data signals are output via respective data outputs 28a, 28b of the second transceiver 8.

In other embodiments, the first and second optical signals may be provided to respective off-the-shelf coherent receivers such as respective AC1200 modules from Acacia Communications Inc.™, which are suitable for demodulating phase-modulated digital optical signals (e.g. QAM-modulated signals). The coherent receivers may output electrical monitoring signals indicative of the SOP to the correlator 20. The electrical monitoring signals may be time-stamped by the respective coherent receivers or by the correlator 20, using the clock signal provided by the clock 24b.

As the two streams of data packets are transmitted in the same multiplexed signal within the same optical fibre 3 (or in parallel fibres 3 in variant embodiments), a disturbance at any position along the optical fibre cable 2 will affect both packet streams.

The correlator 20 is configured to receive the time-stamped electrical monitoring signals from the optical analysis components 19a, 19b. The electrical monitoring signals convey the SOP over time of the first and second optical monitoring signals—e.g. as a time-series of sample values, representative of polarization state, taken at regular time intervals. The correlator 20 comprises logic circuitry for detecting when a change in the SOP of either of the monitoring signals exceeds a threshold value. It may do this by comparing each SOP sample with the immediately-preceding SOP sample and determining if they are different by more than the threshold amount, or by comparing or correlating each sequence of samples with a sequence of earlier-received samples using a sliding time window, e.g. by calculating a vector dot product, and determining if this correlation coefficient exceeds a threshold, or in any other way.

If it determines that a change in SOP of either one of the monitoring signals is greater than a respective threshold value, the correlator 20 forwards a portion of the corresponding time-stamped electrical monitoring signal to the position localiser 30. Thus, the correlator 20 can be thought of as a filter that informs the position localiser 30 of significant changes in the SOP of the first and second monitoring signals, including the time of such changes. This means that the position localiser 30 is provided with time-stamped electrical monitoring signals that are indicative of changes in SOP that are above a certain threshold, and thus suggest the occurrence of a disturbance to the optical fibre cable 2.

Since the time-stamped monitoring signals to be compared are clocked by the same clock 24b, it is not required for the clocks 24a and 24b to be synchronised. However, this may be desired when, for example, the clock 24a of the first transceiver 6 is synchronised to a global timeframe and it is advantageous for the changes in SOP detected by the second transceiver 8 to be monitored within the same global timeframe. Any suitable synchronisation mechanism may be employed in such instances—e.g. using Global Positioning System (GPS) radio signals, or the IEEE 1588 Precision Time Protocol (PTP) over the cable 2.

Figure 3:
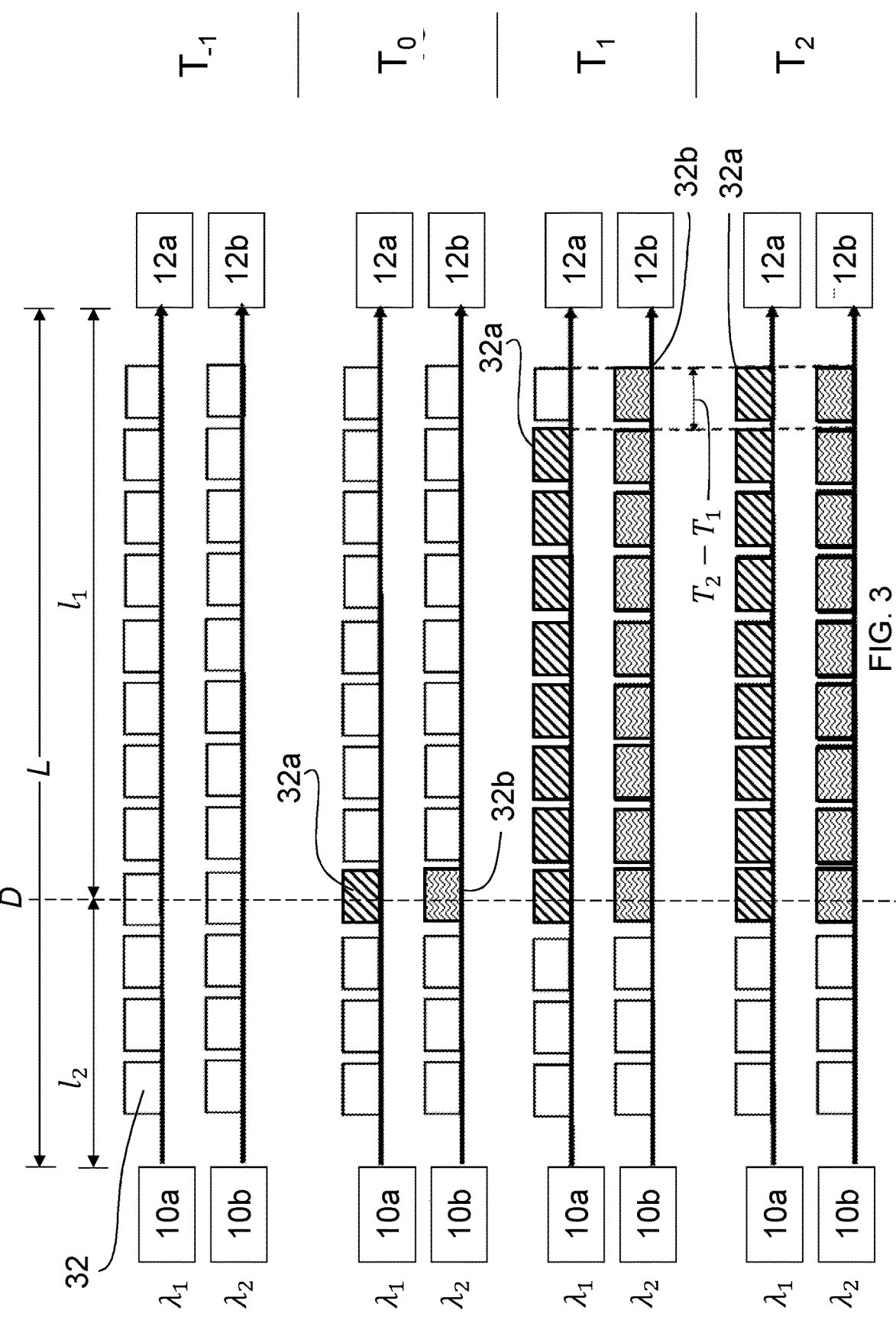
FIG. 3 is a schematic representation of the propagation of optical data packets though the system of FIG. 1.

FIG. 3 shows a schematic representation of the propagation of optical data packets though the system of FIG. 1. In FIG. 3, the horizontal axis is representative of the distance between the first transceiver 6 and the second transceiver 8, while progressive instances $T_{-1}$, $T_0$, $T_1$, $T_2$ in time are represented along the vertical axis.

The top two rows of FIG. 3 show the transmission of discrete data packets 32 from the first transmitter 10a of the first transceiver 6 to the first receiver 12a of the second transceiver 8 (i.e. the first stream of wavelength $\lambda_1$) and from the second transmitter 10b of the first transceiver 6 to the second receiver 12b of the second transceiver 8 (i.e. the second stream of wavelength $\lambda_2$) during normal conditions at time $T_{-1}$.

At time $T_0$ (shown in FIG. 3 by the third and fourth rows from the top), a disturbance to the optical fibre cable 2 occurs at an unknown position D between the first transceiver 6 and the second transceiver 8. As a result of the disturbance, a change occurs in the SOP of data packets 32a, 32b (within both streams) that are located at position D. The affected data packets 32a, 32b are shaded in FIG. 3.

At time $T_1$, the first-affected data packets 32a, 32b within the optical fibre 3 have propagated towards the second transceiver 8. It can be seen from the shaded packets in FIG.

3 that subsequent data packets are also affected by the disturbance as they propagate through the fibre 3 past position D.

In optical fibre systems where more than one wavelength is involved, such as in a WDM system, a slight inconsistency exists between the propagation speeds of the signals of different wavelengths, as a result of chromatic dispersion. This means that, depending on the chromatic dispersion properties of the optical fibres 3 and of the other system components, signals of different wavelengths that are generated simultaneously by transmitters 10a, 10b will arrive at the second transceiver 8 at different times.

This can be seen in FIG. 3, where, at time $T_1$, the change in SOP caused by the disturbance at position D is detected in the second stream of data packets before it is detected in the first stream of data packets. At time $T_1$, the first-affected data packet 32b of the second stream arrives at the second receiver 12b of the second transceiver 8. This data packet 32b has travelled the distance $l_1$ since the disturbance at position D occurred at time $T_0$.

The disturbance may result in a permanent change in SOP or a change that varies over time. Typically the SOP change will be sufficiently slow to be observed at the receivers during a period longer than the delay through the fibre. Mechanical vibrations may cause SOP variations in the order of a few hertz, or fractions of hertz, whereas electromagnetic fields (such as those caused by lightning strikes in the case of aerial cables) may cause changes in the order of Mega-Hertz. Hence it may be that the change in SOP propagates through the fibre only as a short pulse, which may have a duration of a few microseconds.

The change in SOP in the second stream, caused by the disturbance at position D, can now be detected by the second optical analysis component 19b of the second transceiver 8. As described above, the correlator 20 detects when the change in SOP is greater than the threshold value. When this detection occurs, the receiver forwards a portion of the second time-stamped monitoring signal covering at least the first-affected packet 32b to the position localiser 30.

At time $T_2$, the first-affected data packet 32a of the first stream arrives at the first receiver 12a of the second transceiver 8. This data packet 32a has travelled the same distance $l_1$ since the disturbance at position D occurred at time $T_0$, but has travelled at a slightly lower speed.

The change in SOP caused by the disturbance at D is detected by the first optical analysis component 19a of the second transceiver 8. The correlator 20 proceeds to determine, in the same way as described above, that the change in SOP is greater than the threshold value. In response, a portion of the first time-stamped monitoring signal covering at least the first-affected packet 32a is provided to the position localiser 30.

The position localiser module 30 is configured to receive the time-stamped monitoring signals from the correlator 20 and performs cross-correlation steps on the respective portions of the time-stamped monitoring signals to detect similar temporal changes to the SOP of the optical signals received in each stream, occurring within a time window of each other.

When a sufficiently strong similarity is found between a change in the SOP of the first optical monitoring signal (corresponding to the first stream of optical data packets) and a change in the SOP of the second optical monitoring signal (corresponding to the second stream of optical data packets), within the time windows, the position localiser 30 determines that the respective changes in SOP were caused by the same disturbance.

Detecting a correlated change in the parameters is performed within a defined time-window $T_{window}$. The size of the time-window $T_{window}$ is limited by the path length L of the optical fibre 3. A maximum propagation time of a parameter change (i.e. caused by a disturbance) will be observed when the parameter change occurs at the location of the first transceiver 6, as the change must then propagate through the entire length L of the optical fibre 3 for it to be detected by the second transceiver 8. The time taken for the parameter change to reach the second transceiver 8, i.e. the time-window length $T_{window}$, is calculated using the length L of the optical fibre 3, the chromatic dispersion $d_c$ of the fibre 3 and system components, and the difference in the wavelengths $\lambda_1$, $\lambda_2$ of the first and second streams. Chromatic dispersion is commonly specified as ps/(nm km)—i.e. by how many picoseconds a pulse with a spectral width of one nanometer will spread for every kilometre it travels along a fibre; however, values may be processed by the position localiser 30 using any appropriate units.

The time-window length $T_{window}$ is given by:

$$T_{window} = L \cdot d_c |\lambda_1 - \lambda_2| \tag{1}$$

The detection and correlation of the measured parameter occurs continuously, over the common duration of the monitoring portions forwarded by the correlator 20 whenever it has detected changes above the threshold. The time-window $T_{window}$ is thus continually shifted with time. The position localiser 30 calculates a correlation coefficient, over time, for the two signal portions, which it checks against a predetermined significance threshold.

When the position localiser 30 detects a significant correlation, within the time window $T_{window}$, it proceeds to determine, using the time-stamped monitoring signals provided by the correlator 20, the times of arrival $T_1$ and $T_2$ of the changes in SOP at the second transceiver 8, and calculates the time $T_2 - T_1$ between the detection of the change in SOP in the first stream and the detection of the change in SOP in the second stream.

In some variant embodiments, instead of checking against local threshold and forwarding only a portion of monitoring signal, the correlator 20 may be configured to forward the entire respective monitoring signal to the position localiser 30 continuously, and the position localiser 30 may continuously cross-correlate the signals received from the correlator 20 to determine a time difference between correlated significant changes. However, this may not be practicable in every situation, due to the high data bandwidth required.

In some further variant embodiments, the correlator 20 processes the respective monitoring signal and then simply signals an above-threshold change in SOP to the position localiser 30 by sending a single respective time value, e.g. $T_1$, of the detected significant change in SOP, without sending any portion of the monitoring signal. The position localiser 30 may then check that two respective time values signalled by the correlator 20, with respect to each monitoring signal, are within a maximum permitted time window, and determine the position by subtracting the earlier time from the later time. This approach is simpler to implement than performing cross-correlation at the position localiser module 30, but may generate more false detections.

In all cases, the difference $T_2–T_1$ in the times of arrival of the same change in SOP at the first and second receivers 12a, 12b is a function of the total chromatic dispersion $d_c$ of the optical fibre 3 and system components, the difference in the wavelengths $\lambda_1$, $\lambda_2$ of the two streams and the distance $l_1$ from the receivers 12a, 12b to the location D of the parameter change:

$$T_2–T_1 = l_1 d_c |\lambda_1–\lambda_2| \qquad (2)$$

Thus, the distance $l_1$ is given by:

$$l_1 = \frac{T_2 – T_1}{d_c|\lambda_2 – \lambda_1|} \qquad (3)$$

The position localiser 30 determines the distance $l_1$ from the receivers 12a, 12b to the disturbance D using Equation 3. The distance $l_2$ from the transmitters 10a, 10b may also be subsequently calculated using $l_2=L–l_1$ if required and if the position localiser 30 knows the total length L.

By way of example, if there is a difference of 17 ps between two received signals of 1 nm wavelength difference, and the aggregate chromatic dispersion through the cable is 17 ps/nm*km, then the distance to the disturbance (e.g. a point of impact) would be calculated as 1 km from the second transceiver 8.

An optical transmission system may use several wavelengths in a WDM configuration so as to increase the total capacity of the system. For such a system, there will be several wavelengths and sets of wavelengths available for parameter monitoring. By calculating the distance $l_1$ using the above-described method for a plurality of pairs of streams, having different wavelengths, a more accurate and reliable calculation may be possible, e.g. by determining an average value of $l_1$ or by the application of correlation methods such as machine learning to all monitored signals.

In some optical transmission systems, devices may be included to compensate for chromatic dispersion. An optical fibre 3 may comprise a plurality of spans of optical fibre, coupled end-to-end, each of the spans contributing to a total end-to-end system chromatic dispersion. Dispersion compensating devices may be used to reduce or eliminate the total end-to-end chromatic dispersion between the transmitter and the receiver. If one or more of these devices is located between the receiver and the location of a disruption, then the arrival times of the consequential parameter changes will be affected by the chromatic dispersion compensation. In this case, in order to calculate the distance $l_1$ from the monitoring receiver to the position of the disruption, the total chromatic dispersion of the system, including the effect of all contributing chromatic dispersion compensation components, may be used by the position localiser 30 when evaluating Equation (3).

The position localiser module 30 may determine the location as a distance along the cable 2, or it may have access to map data representative of a geographical location of the cable 2, and so calculate a coordinate of the disturbance (e.g. latitude and longitude). It may comprise a display screen or a loud speaker or other output mechanism to alert a human user to the detection. Alternatively or additionally it may output a signal of a significant detection, including the location estimate, to a remote monitoring client, e.g. over a network connection. It may output the signal immediately, or as part of a periodic batch process— e.g. a daily log file. Any of these mechanisms can allow maintenance of the cable 2 to be undertaken, or any other approach action take, as appropriate, without undue delay, as a worker can be directed accurately to the location of the disturbance.

In some embodiments, instead of monitoring polarisation, the correlator 20 may monitor a different parameter, such as optical power or amplitude, signal-to-noise ratio (SNR), bit error ratio (BER), to detect significant changes in the parameter over time, which may arise from a disturbance along the cable 2. The position localiser module 30 may detect similar patterns of parameter changes over time occurring on both wavelengths, separated by less than the time window $T_{window}$.

In some further embodiments, the correlator 20 may monitor two or more such parameters, such as both SOP and amplitude, and may signal when one or more of these changes significantly. The position localiser module 30 may then be configured to detect similar patterns of changes in the first parameter across the two signals and to detect similar patterns of changes in the second parameter across the two signals. For reliably detecting disturbances that can affect two parameters, such as both SOP and amplitude, at the same time, the position localiser 30 may cross-correlate the changes in a first parameter with the changes in a second parameter; it may do this within one wavelength and/or across the two wavelengths.

In some embodiments, instead of a sub-sea cable, the system may be used to monitor a land-based communications cable, such as a buried cable or an aerial cable. In this case, a disturbance could be caused by a lightning strike or a falling tree, in addition to vehicle collisions, earthquakes, etc.

It will be appreciated by those skilled in the art that the invention has been illustrated by describing certain specific embodiments thereof, but is not limited to these embodiments; many variations and modifications are possible, within the scope of the accompanying claims.

The invention claimed is:

1. An apparatus for determining a position of a disturbance to an optical fibre assembly, the apparatus comprising:
   a detector system; and
   a processing system, coupled to the detector system,
wherein the apparatus is arranged to:
   receive concurrently at the detector system a first digital optical signal having a first wavelength from an optical fibre assembly and a second digital optical signal having a second wavelength from the optical fibre assembly;
   measure a common parameter of the first and second digital optical signals, wherein the parameter is a state of polarisation;
   monitor the parameter of the first and second digital optical signals over time;
   determine first data representative of a first time, being a time at which a change occurs in said parameter of the first digital optical signal received at the detector system, the change arising from a disturbance to the optical fibre assembly;
   determine second data representative of a second time, being a time at which a change occurs in said parameter of the second digital optical signal received at the detector system, the change arising from the disturbance to the optical fibre assembly; and
   process the first data and the second data to determine a position of the disturbance.

2. The apparatus of claim 1, wherein the processing system is configured to determine the position of the disturbance from a difference between the first time and the second time.

3. The apparatus of claim 2, wherein the processing system is configured to determine the position of the disturbance additionally from:

a total chromatic dispersion of the optical fibre assembly; and a difference between the first wavelength and the second wavelength.

4. The apparatus of claim 1, wherein the processing system is configured to:

determine the first time by determining that a change in the parameter of the first digital optical signal meets a first criterion;

determine the second time by determining that a change in the parameter of the second digital optical signal meets a second criterion; and process the first data and the second data to determine a position of the disturbance in response to determining that the first criterion and the second criterion are met.

5. The apparatus of claim 1, wherein:

the first data comprises a first series of values representative of changes in the parameter of the first digital optical signal over time;

the second data comprises a second series of values representative of changes in the parameter of the second digital optical signal over time; and the processing system is configured to perform a cross-correlation operation between the first data and the second data when determining the position of the disturbance.

6. The apparatus of claim 1, wherein:

the first data encodes the parameter, or a time derivative of the parameter, or frequency or spectral information relating to changes in the parameter over time, for the first digital optical signal; and the second data encodes the parameter, or a time derivative of the parameter, or frequency or spectral information relating to changes in the parameter over time, for the second digital optical signal.

7. The apparatus of claim 1, wherein the apparatus further comprises an optical analysis system, comprising:

a first optical analysis component, configured to output a first monitoring signal that represents changes in the parameter of the first digital optical signal; and a second optical analysis component, configured to output a second monitoring signal that represents changes in the parameter for the second digital optical signal;

wherein the processing system is arranged to cross-correlate the first monitoring signal and the second monitoring signal to determine a time difference between the first time and the second time.

8. The apparatus of claim 7, wherein the first and the second optical analysis components are configured to time-stamp the first and second monitoring signals respectively according to times that the first and second digital optical signals respectively arrive at the apparatus, using a clock of the apparatus.

9. The apparatus of claim 1, wherein the apparatus is configured to monitor a further parameter of one or both of the first and second digital optical signals, received at the apparatus, in addition to monitoring the parameter, wherein the further parameter is amplitude, signal-to-noise ratio, or bit error ratio, and wherein the apparatus is configured to process data representative of the further parameter, for one or both of the first and second digital optical signals, when determining the position of the disturbance.

10. The apparatus of claim 1, configured to receive the first and second digital optical signals from a single optical fibre.

11. The apparatus of claim 1, further comprising a clock, wherein the apparatus is configured to receive time-stamped synchronisation packets over the optical fibre assembly for the purpose of synchronising the clock with an external clock.

12. The apparatus of claim 11, wherein the time-stamped synchronisation packets are embedded within one or both of the first digital optical signal and the second digital optical signal.

13. A detector system for use in a method of determining a position of a disturbance to an optical fibre assembly, the detector system being configured to:

receive a first digital optical signal having a first wavelength and a second digital optical signal having a second wavelength from an optical fibre assembly;

monitor a common parameter of the received first and second digital optical signals over time, wherein the parameter is a state of polarisation;

determine first data representative of a first time, being a time at which a change occurs in said parameter of the received first digital optical signal, the change arising from a disturbance to the optical fibre assembly; and determine second data representative of a second time, being a time at which a change occurs in said parameter of the received second digital optical signal, the change arising from the disturbance;

wherein the first data and second data are suitable for processing to determine a position of the disturbance.

14. The detector system of claim 13, further comprising an optical analysis system comprising:

a first optical analysis component, configured to output a first monitoring signal that represents changes in the parameter of the first digital optical signal; and a second optical analysis component, configured to output a second monitoring signal that represents changes in the parameter for the second digital optical signal.

15. The detector system of claim 14, wherein the detector system comprises a first coherent receiver, comprising the first optical analysis component, and a second coherent receiver, comprising the second optical analysis component.

16. The detector system of claim 14, further comprising a clock, wherein the first and the second optical analysis components are configured to use the clock to time-stamp the first and second monitoring signals respectively according to times that the first and second digital optical signals respectively arrive at the detector system.

17. The detector system of claim 13, wherein the detector system is a detector unit in a housing.

18. The detector system of claim 13, further configured to send the first data and the second data to a remote processing system.

19. A method of determining a position of a disturbance to an optical fibre assembly, the method comprising:

receiving a first digital optical signal having a first wavelength and a second digital optical signal having a second wavelength from an optical fibre assembly;

monitoring a common parameter of the received first and second digital optical signals over time, wherein the parameter is a state of polarisation;

determining first data representative of a time at which a change occurs in said parameter of the received first digital optical signal, the change arising from a disturbance to the optical fibre assembly;

determining second data representative of a time at which a change occurs in said parameter of the received second digital optical signal, the change arising from the disturbance; and processing the first data and the second data to determine a position of the disturbance.

20. An apparatus for determining a position of a disturbance to an optical fibre assembly, the apparatus comprising:

a detector system; and a processing system, coupled to the detector system, wherein the apparatus is arranged to:

receive concurrently at the detector system a first digital optical signal having a first wavelength from an optical fibre assembly and a second digital optical signal having a second wavelength from the optical fibre assembly;

measure a common parameter of the first and second digital optical signals, monitor the parameter of the first and second digital optical signals over time;

determine first data representative of a first time, being a time at which a change occurs in said parameter of the first digital optical signal received at the detector system, the change arising from a disturbance to the optical fibre assembly, wherein the first data comprises a first series of values representative of changes in the parameter of the first digital optical signal over time;

determine second data representative of a second time, being a time at which a change occurs in said parameter of the second digital optical signal received at the detector system, the change arising from the disturbance to the optical fibre assembly, wherein the second data comprises a second series of values representative of changes in the parameter of the second digital optical signal over time; and process the first data and the second data to determine a position of the disturbance, wherein the processing system is configured to perform a cross-correlation operation between the first data and the second data when determining the position of the disturbance.

21. An apparatus for determining a position of a disturbance to an optical fibre assembly, the apparatus comprising:

a detector system; and a processing system, coupled to the detector system, wherein the apparatus is arranged to:

receive concurrently at the detector system a first digital optical signal having a first wavelength from an optical fibre assembly and a second digital optical signal having a second wavelength from the optical fibre assembly;

measure a common parameter of the first and second digital optical signals, monitor the parameter of the first and second digital optical signals over time;

determine first data representative of a first time, being a time at which a change occurs in said parameter of the first digital optical signal received at the detector system, the change arising from a disturbance to the optical fibre assembly;

determine second data representative of a second time, being a time at which a change occurs in said parameter of the second digital optical signal received at the detector system, the change arising from the disturbance to the optical fibre assembly; and process the first data and the second data to determine a position of the disturbance;

wherein the apparatus further comprises an optical analysis system, comprising:

a first optical analysis component, configured to output a first monitoring signal that represents changes in the parameter of the first digital optical signal; and a second optical analysis component, configured to output a second monitoring signal that represents changes in the parameter for the second digital optical signal;

wherein the processing system is arranged to cross-correlate the first monitoring signal and the second monitoring signal to determine a time difference between the first time and the second time.

22. An apparatus for determining a position of a disturbance to an optical fibre assembly, the apparatus comprising:

a detector system; and a processing system, coupled to the detector system, wherein the apparatus is arranged to:

receive concurrently at the detector system a first digital optical signal having a first wavelength from an optical fibre assembly and a second digital optical signal having a second wavelength from the optical fibre assembly;

measure a common parameter of the first and second digital optical signals, monitor the parameter of the first and second digital optical signals over time;

determine first data representative of a first time, being a time at which a change occurs in said parameter of the first digital optical signal received at the detector system, the change arising from a disturbance to the optical fibre assembly;

determine second data representative of a second time, being a time at which a change occurs in said parameter of the second digital optical signal received at the detector system, the change arising from the disturbance to the optical fibre assembly; and process the first data and the second data to determine a position of the disturbance;

wherein the apparatus further comprises a clock, and wherein the apparatus is configured to receive time-stamped synchronisation packets over the optical fibre assembly for the purpose of synchronising the clock with an external clock.

23. A detector system for use in a method of determining a position of a disturbance to an optical fibre assembly, the detector system being configured to:

receive a first digital optical signal having a first wavelength and a second digital optical signal having a second wavelength from an optical fibre assembly;

monitor a common parameter of the received first and second digital optical signals over time; and determine first data representative of a first time, being a time at which a change occurs in said parameter of the received first digital optical signal, the change arising from a disturbance to the optical fibre assembly; and determine second data representative of a second time, being a time at which a change occurs in said parameter of the received second digital optical signal, the change arising from the disturbance;

wherein the first data and second data are suitable for processing to determine a position of the disturbance;

wherein the detector system comprises an optical analysis system comprising:

a first optical analysis component, configured to output a first monitoring signal that represents changes in the parameter of the first digital optical signal; and a second optical analysis component, configured to output a second monitoring signal that represents changes in the parameter for the second digital optical signal; and wherein the detector system comprises a first coherent receiver, comprising the first optical analysis component, and a second coherent receiver, comprising the second optical analysis component.

24. A detector system for use in a method of determining a position of a disturbance to an optical fibre assembly, the detector system being configured to:

receive a first digital optical signal having a first wavelength and a second digital optical signal having a second wavelength from an optical fibre assembly;

monitor a common parameter of the received first and second digital optical signals over time; and determine first data representative of a first time, being a time at which a change occurs in said parameter of the received first digital optical signal, the change arising from a disturbance to the optical fibre assembly; and determine second data representative of a second time, being a time at which a change occurs in said parameter of the received second digital optical signal, the change arising from the disturbance;

wherein the first data and second data are suitable for processing to determine a position of the disturbance;

wherein the detector system comprises a clock and an optical analysis system, the optical analysis system comprising:

a first optical analysis component, configured to output a first monitoring signal that represents changes in the parameter of the first digital optical signal; and a second optical analysis component, configured to output a second monitoring signal that represents changes in the parameter for the second digital optical signal;

wherein the first and the second optical analysis components are configured to use the clock to time-stamp the first and second monitoring signals respectively according to times that the first and second digital optical signals respectively arrive at the detector system.

* * * * *